Patented Aug. 14, 1951

2,563,898

UNITED STATES PATENT OFFICE 2,563,898

COPRECIPITATED RESINS, PRODUCTS CONTAINING SAME, AND PROCESSES OF MAKING BOTH OF SAME

Lucius H. Wilson, Greenwich, Chester G. Landes, New Canaan, and Charles S. Maxwell, Old Greenwich, Conn., assignors to American Cyanamid Company, New York, N. Y., a corporation of Maine No Drawing. Application July 13, 1945, Serial No. 604,967

2 Claims. (Cl. 260—29.4)

This invention relates to the flocculation or coprecipitation of dispersions of thermoplastic resinous materials with melamine-aldehyde resins, to the coagulates so obtained, and to casting and molding processes involving the use of these coagulates.

A wide variety of thermoplastic, water-insoluble resins can be prepared in the form of aqueous dispersions of relatively fine particle size. Representative dispersions of this type are polystyrene and polymethacrylate emulsions prepared by the emulsion polymerization of styrene and of methylmethacrylate. Other emulsions are prepared by pouring molten resins into rapidly agitated aqueous solutions of emulsifying agents. Similar emulsions are also prepared with the aid of organic, water-insoluble solvents for the resinous or resin-forming materials.

We have found that aqueous dispersions of water-insoluble thermoplastic resins of the type of polystyrene, polyacrylates, polymethacrylates and the like can be flocculated or coagulated by admixture with colloidal cationic melamine-aldehyde resin solutions to produce flocculates or coagulates of novel and distinctive properties. Flocks or coagulates prepared by this method are obtained in the form of finely divided particles in which the two types of resin are present in intimate admixture, so that the molding properties of the thermoplastic resin are modified by the thermosetting melamine-aldehyde resin. This is of particular importance in obtaining thermoplastic molding powders of increased softening point and of improved hardness.

The flocculating agents which we employ in practicing our invention, and which we designate as "colloidal cationic melamine-aldehyde resin" or, for greater brevity "colloidal melamine resin" are described in detail in U. S. Patent No. 2,345,543. These cationic resin solutions are most readily obtained by dissolving a substantially monomeric or only partially cured melamine-aldehyde resin, preferably a melamine-formaldehyde condensation product containing about 2–6 mols of combined formaldehyde for each mol of melamine, in water acidified to a pH within the range of about 0.5 to about 4.5, the exact acidity depending upon the kind of acid and the percentage of resin solids, followed by aging the solution at ordinary or only slightly elevated temperatures. Upon aging in this manner the dissolved resin is slowly converted to a colloidal condition in which the resin particles carry a positive electric charge. It is in this condition that we employ the aqueous resin solutions in practicing our present invention.

As has been noted above, a wide variety of thermoplastic resins can be flocculated or coagulated from aqueous dispersions thereof, by the action of the colloid melamine resin. Polyvinyl compounds such as polystyrene, polymers of substituted styrenes such as the mono- or dimethyl or chloro-styrenes, polyacrylates, (e. g., polymers of methyl, ethyl, propyl, n-butyl, isobutyl, tertiary butyl, cyclohexyl and octyl acrylates), polymethacrylates (e. g., polymers of methyl, ethyl, propyl, n-butyl, isobutyl, tertiary butyl, cyclohexyl and octyl methacrylates), polyvinyl acetal, polyvinyl esters such as vinyl chloride polymers and vinyl acetate polymers or copolymers of vinyl acetate with vinyl chloride or copolymers of vinyl chloride and vinylidene chloride may be used. Similarly, copolymers of styrene with vinyl chloride or with acrylic acid esters or acrylonitrile and the like may be prepared in the form of aqueous dispersions and coagulated or flocculated by the process of the present invention. Other thermoplastic resins which may be treated in this manner are the thermoplastic phenol-formaldehyde resins, including phenol-acetaldehyde and phenol-furfural resins and the corresponding resins obtained from cresols and other alkyl phenols. Still other resins of this class are the coumarone resins, polyindene resins, vinyl acetylene resins and the like. It is evident, therefore, that the process of the present invention is general in character, and can be applied to any thermoplastic resin capable of forming an aqueous dispersion of fine particle size.

Although dispersing or emulsifying agents of any suitable type may be employed in preparing aqueous dispersions of the above and similar thermoplastic resins, we greatly prefer to use the anionic or non-anionic dispersing agents since a much more rapid and complete coagulation or flocculation is obtained when these classes of dispersing agents are used. Typical anionic emulsifying agents which we have employed with success are the soaps of aliphatic and cycloaliphatic acids such as potassium oleate, potassium naphthenate and the like; amine soaps such as triethanolamine oleate, sulphonated aliphatic compounds such as sodium lauryl sulfate and the sulfates of higher secondary alcohols; sulfonated products such as sodium keryl benzene sulfonate, sodium isopropyl naphthalene sulfonate, esters of sulfocarboxylic acids such as the esters of sodium sulfoacetate, dialkyl sulfosuccinates, di-sodium monoalkyl sulfosuccinamates, sulfonated lignin and the like.

Typical non-anionic emulsifying agents which may be used are polyethylene glycol-substituted maleic acid esters of the formula

HO(CH₂O)ₙCH₂O.CH.(COOR)CH₂.COOR mannitan and sorbitan monoesters of higher fatty acids such as palmitic, stearic and oleic acids and their ethylene oxide condensation products and aryl-alkyl polyether alcohols.

The invention in its broader aspects is not limited by the methods used in preparing the aqueous thermoplastic resin dispersions, and any suitable method may be used. As is noted above, compounds capable of emulsion polymerization may be converted into aqueous dispersions of fine particle size by this method. Other compounds which are soluble or dispersible in organic solvents such, for example, as coumarone and polyindene resins may be emulsified as solutions in these solvents. The following procedure, in which the proportions are in parts by weight, for the emulsion polymerization of styrene is one example of many that may be employed:

A solution containing 1.2 parts of a higher alkyl sulfate (molecular weight 350) in 58.8 parts of water is prepared and heated to 94° C. and 0.05 part of 40% hydrogen peroxide is added. 40 parts of styrene are then introduced uniformly over a period of about 1.5 hours. The exothermic polymerization reaction proceeds smoothly and is complete after about 3.5 hours. Steam is then blown through the batch to remove any unpolymerized material, and the concentration of solids in the dispersion is adjusted to about 25% solids. An aqueous suspension of polystyrene of relatively high molecular weight, having an average particle size of the order of 0.25–0.5 microns is obtained.

A substantially complete coagulation or flocculation of the dispersed thermoplastic resins is obtained when about 2–15% of their weight of cationic melamine-formaldehyde resin colloid is applied, the exact amount depending on the particle size of the dispersed thermoplastic resin and on the pH of the suspension. Thus, for example, 10 parts by weight of the melamine resin are required to flocculate 100 parts of the emulsion-polymerized polystyrene described above if the polystyrene suspension is neutralized to a pH of about 7 by the addition of sodium hydroxide before the melamine resin colloid has been added. Without the addition of alkali, and at a pH of about 4.0 (resulting from the acidity of the melamine resin colloid), only about 5–7 parts of the melamine resin colloid are required. If sufficient alkali is used to raise the pH of the polystyrene suspension to about 10 about 15 parts of the melamine resin colloid are needed. It should be understood, however, that much larger quantities of the melamine resin, up to 100% or more on the weight of the thermoplastic resin, may be used if desired, and that these large quantities are flocculated or coprecipitated by the process of the invention. The amounts of the colloidal melamine-formaldehyde resin are therefore not restricted to those which will bring about flocculation of the thermoplastic resin, but also include larger amounts that may be desirable to modify the characteristics of the resinous product.

After mixing the colloidal, cationic melamine-aldehyde resin with the thermoplastic resin dispersion and agitating to complete the flocculation, the resinous mixture may be recovered by any suitable procedure. With many thermoplastic resins such as polystyrene, polyindene and the like, the resinous product is obtained as a powder simply by filtering and drying the filter cake. Other resins, such as polymerized methylmethacrylate, may require evaporation of the water under a partial vacuum at temperatures below the softening point of the resin.

The invention will be further illustrated by the following specific examples in which the proportions are in parts by weight, to which, however, it is not limited.

*Example 1*

A 12% solution of cationic melamine-formaldehyde resin colloid containing about 5 parts of resin is diluted with about 2000 parts of water and about 200 parts of an aqueous emulsion containing 50 parts of polystyrene are added with agitation, the polystyrene is immediately flocculated and the resulting precipitate is filtered off. The filtrate is clear, indicating that complete precipitation of the polystyrene has been obtained.

The precipitated resin is dried, ground, and a portion is molded at about 155° C. and 36 pounds/sq. inch to produce a translucent molded article. Analysis of a sample of the resin prepared in accordance with this example shows that it contains about 6.75% of melamine-formaldehyde resin based upon a nitrogen analysis.

*Example 2*

Example 1 is repeated using 25 parts of the melamine-formaldehyde resin colloid and 25 parts of polystyrene contained in about 100 parts of an aqueous dispersion. However, in this example the liquid of the suspension is neutralized with ammonia prior to filtration and after flocculation. A clear filtrate is obtained in accordance with this example showing that a complete precipitation is obtained. The coprecipitated polystyrene-melamine-formaldehyde resin contains about 46% of melamine-formaldehyde resin solids.

These examples show the flocculating action of the colloidal cationic melamine-aldehyde solutions in the absence of fibrous cellulosic material and Example 2 illustrates the precipitation of excess melamine resin colloid in the system over and above the minimum necessary to flocculate the dispersed thermoplastic resin. It should be understood that we do not claim in this application flocculation of dispersed thermoplastic resin in the presence of cellulosic fibers as this is disclosed and claimed in our copending application Serial No. 604,904, filed concurrently herewith.

The coprecipitated or flocculated resins produced in accordance with the present invention may be used for the manufacture of shaped articles by molding, and for many other purposes. They may be employed as adhesives to join together the same or diverse substances, including paper, cloth, metal, wood, glass etc.

The resinous materials prepared in accordance with this invention may be used for the production of coatings, for example, by hot-melt application.

Our resinous compositions may be admixed with fillers, dyes, pigments or diluents as well as with other resinous materials if desired.

We claim:
1. A process which comprises mixing a colloidal aqueous solution of a cationic melamine-formaldehyde resin with an aqueous dispersion of a synthetic, water-insoluble thermoplastic resin, said dispersion being formed by means of an anionic dispersing agent, whereby said dispersion is flocculated and the melamine-aldehyde resin coprecipitated with said thermoplastic resin, said melamine-formaldehyde resin being one having a glass electrode pH value within the range of about 0.5 to about 3.5 when measured at 15% solids, said resin containing about 2-2.5 mols of combined formaldehyde for each mol of melamine and having a degree of polymerization less than that which characterizes gels and precipitates which are undispersible by agitation with water but sufficient to bring the particles thereof within the colloidal range, said resin having a definite positive electrical charge as shown by its migration toward the cathode upon electrophoresis of the solution.

2. A process which comprises mixing a colloidal aqueous solution of a cationic melamine-formaldehyde resin with an aqueous dispersion of a polystyrene resin, said dispersion being formed by means of an anionic dispersing agent, whereby said dispersion is flocculated and the melamine-formaldehyde resin coprecipitated with said thermoplastic resin, said melamine-formaldehyde resin being one having a glass electrode pH value within the range of about 0.5 to about 3.5 when measured at 15% solids, said resin containing about 2-2.5 mols of combined formaldehyde for each mol of melamine and having a degree of polymerization less than that which characterizes gels and precipitates which are undispersible by agitation with water but sufficient to bring the particles thereof within the colloidal range, said resin having a definite positive electrical charge as shown by its migration toward the cathode upon electrophoresis of the solution.

LUCIUS H. WILSON.
CHESTER G. LANDES.
CHARLES S. MAXWELL.

REFERENCES CITED

The following references are of record in the file of this patent:

UNITED STATES PATENTS

| Number    | Name        | Date           |
|-----------|-------------|----------------|
| 2,192,318 | Kirby       | Mar. 5, 1940   |
| 2,277,941 | Almy        | Mar. 31, 1942  |
| 2,294,590 | West        | Sept. 1, 1942  |
| 2,322,888 | Schwartz    | June 29, 1943  |
| 2,325,987 | Swain       | Aug. 3, 1943   |
| 2,345,543 | Wohnsiedler | Mar. 28, 1944  |
| 2,351,602 | D'Alelio    | June 20, 1944  |
| 2,367,511 | Lowe        | Jan. 16, 1945  |
| 2,394,009 | Pollard     | Feb. 5, 1946   |
| 2,407,376 | Maxwell     | Sept. 10, 1946 |
| 2,416,447 | Laughlin    | Feb. 25, 1947  |